United States Patent
Richards et al.

(10) Patent No.: US 9,690,607 B2
(45) Date of Patent: Jun. 27, 2017

(54) SYSTEM AND METHOD FOR GENERIC PRODUCT WIRING IN A VIRTUAL ASSEMBLY BUILDER ENVIRONMENT

(71) Applicant: ORACLE INTERNATIONAL CORPORATION, Redwood Shores, CA (US)

(72) Inventors: Jon Richards, Hood River, OR (US); Troy Schulz, Forest Grove, OR (US); Sam Jackson, Portland, OR (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 92 days.

(21) Appl. No.: 14/213,370

(22) Filed: Mar. 14, 2014

(65) Prior Publication Data

US 2014/0282545 A1    Sep. 18, 2014

Related U.S. Application Data

(60) Provisional application No. 61/798,720, filed on Mar. 15, 2013.

(51) Int. Cl.
*G06F 9/455* (2006.01)
*G06F 9/50* (2006.01)

(52) U.S. Cl.
CPC ...... *G06F 9/45558* (2013.01); *G06F 9/45533* (2013.01); *G06F 9/5072* (2013.01); *G06F 2009/45595* (2013.01)

(58) Field of Classification Search
CPC ............. G06F 11/1484; G06F 11/1438; G06F 9/44505; G06F 15/177; G06F 9/45533;
(Continued)

(56) References Cited

U.S. PATENT DOCUMENTS

2003/0088604 A1* 5/2003 Kuck .................. G06F 9/4843
                                                              718/1
2009/0125878 A1  5/2009 Cullum
(Continued)

FOREIGN PATENT DOCUMENTS

WO      2007035545       3/2007

OTHER PUBLICATIONS

Thanawala, et al., Oracle SaaS Platform: Building On-Demand Applications; An Oracle White Paper, Sep. 2008, 21 pages.
(Continued)

*Primary Examiner* — Lewis A Bullock, Jr.
*Assistant Examiner* — Jacob Dascomb
(74) *Attorney, Agent, or Firm* — Tucker Ellis LLP

(57) ABSTRACT

Described herein is a system and method for generic product wiring in a cloud environment. In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts. In accordance with an embodiment, a generic product introspector plugin allows users to specify at introspection, during creation of a virtual assembly, one or more metadata properties to be exposed for editing and configuration by scripts, during a subsequent rehydration of the virtual assembly. The properties exposed for editing and configuration by scripts can be used during instantiation of an instance of the assembly to define one or more inputs and outputs for the instance.

20 Claims, 9 Drawing Sheets

(58) Field of Classification Search
CPC ............... G06F 9/5072; G06F 9/45537; G06F 9/45558; G06F 2009/45595
See application file for complete search history.

(56) References Cited

U.S. PATENT DOCUMENTS

| | | | | |
|---|---|---|---|---|
| 2009/0288084 | A1* | 11/2009 | Astete | G06F 9/45533 718/1 |
| 2012/0102486 | A1 | 4/2012 | Yendluri | |
| 2013/0055253 | A1 | 2/2013 | Jubran | |
| 2014/0059541 | A1* | 2/2014 | Heninger | G06F 8/63 718/1 |
| 2014/0123136 | A1* | 5/2014 | Beda, III | G06F 9/45558 718/1 |

OTHER PUBLICATIONS

Piech, Platform-as-a-Service Private Cloud with Oracle Fusion Middleware, An Oracle White Paper, Oct. 2009, 20 pages.
Unknown Author, Cost Effective Security and Compliance with Oracle Database 11g Release 2, An Oracle White Paper, Mar. 2011, 14 pages.
Joshi, et al., Bridging the Divide between SaaS and Enterprise Datacenters, An Oracle White Paper, Feb. 2010, 18 pages.
McKendrick, Privatizing the Cloud, Oct. 2010, 33 pages, IOUG Survey on Cloud Computing.
Glas, et al., Achieving the Cloud Computing Vision, An Oracle White Paper in Enterprise Architecture, Oct. 2010, 22 pages.
Venkataraman, et al., Oracle's Cloud Solutions for Public Sector, An Oracle White Paper, Apr. 2011, 28 pages.
Unknown Author, Creating a Self-Service Dev/Test Cloud, A Case Study from Oracle Product Development IT, An Oracle White Paper, Jul. 2011, 12 pages.
Unknown Author, Oracle Exadata Database Machine, Security Overview, 2011, 2 pages.
Chauhan, et al., On-Demand Sourcing: Driving Costs Down and Value Up in a Period of Increased Business Volatility, Jun. 11, 2010, 5 pages.
Unknown Author, Oracle Identity Management 11g, 2010, 4 pages.
Silverstein, et al., Architectural Strategies for IT Optimization: From Silos to Clouds, An Oracle White Paper on Enterprise Architecture, May 2010, 21 pages.
Unknown Author, Oracle Optimized Solution for Enterprise Cloud Infrastructure, An Oracle Technical White Paper, Jun. 2011, 32 pages.
Wang, Oracle Cloud Computing, An Oracle White Paper, Jun. 2011, 16 pages.
Gulati, Cloud Management Using Oracle Enterprise Manager 11g, An Oracle White Paper, Apr. 2010, 25 pages.
Unknown Author, Accelerating Enterprise Cloud Infrastructure Deployments, 2011, 4 pages.
Wahl, et al., Oracle Advanced Security with Oracle Database 11g Release 2, Oracle White Paper, Oct. 2010, 12 pages.
Unknown Author, Reduce TCO and Get More Value from your X86 Infrastructure, 2011, 4 pages.
Unknown Author, Oracle Offers ISVs Comprehensive Platform to Deliver SaaS Applications, 2008, 2 pages.
Kumar, et al., The Most Complete and Integrated Virtualization: From Desktop to Datacenter, An Oracle White Paper, Oct. 2010, 13 pages.
International Searching Authority at the European Patent Office, International Search Report and Written Opinion for PCT International Application No. PCT/US2014/029441, Jul. 1, 2014, 8 pages.

* cited by examiner

US 9,690,607 B2

SYSTEM AND METHOD FOR GENERIC PRODUCT WIRING IN A VIRTUAL ASSEMBLY BUILDER ENVIRONMENT

CLAIM OF PRIORITY

This application claims the benefit of priority to U.S. Provisional Application titled "SYSTEMS AND METHODS FOR GENERIC PRODUCT WIRING AND OTHER VIRTUAL ASSEMBLY BUILDER FEATURES", Application No. 61/798,720, filed Mar. 15, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems and methods for use with a cloud computing environment, and are particularly related to systems and methods for generic product wiring in a virtual assembly builder environment.

BACKGROUND

Generally described, virtualization is the process of abstracting computer hardware resources, such as its processor, memory, storage, and network interfaces, from an operating system and software applications running thereon. A computer can include a virtualization component, such as a hypervisor, which enables the installation of multiple operating systems, each of which are capable of running simultaneously and independently within their own secure environment. Virtualization can make deployment of complete processing environments faster, easier, and more efficient.

For example, a cloud environment enables responsibilities which previously may have been provided by an organization's own information technology department, to be delivered as service layers, for use by consumers that are either internal (i.e., private) or external (i.e., public) to the organization. Cloud environments can utilize virtualization features to quickly and easily modify how a particular service should be configured, provisioned, and controlled. These are some examples of the types of environments in which embodiments of the invention can be used.

SUMMARY

Described herein is a system and method for generic product wiring in a cloud environment. In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts. In accordance with an embodiment, a generic product introspector plugin allows users to specify at introspection, during creation of a virtual assembly, one or more metadata properties to be exposed for editing and configuration by scripts, during a subsequent rehydration of the virtual assembly. The properties exposed for editing and configuration by scripts can be used during instantiation of an instance of the assembly to define one or more inputs and outputs for the instance.

DETAILED DESCRIPTION

As described above, virtualization is the process of abstracting computer hardware resources, such as its processor, memory, storage, and network interfaces, from an operating system and software applications running thereon. For example, a computer can include a virtualization component, such as a hypervisor, which enables the installation of multiple operating systems, each of which are capable of running simultaneously and independently within their own secure environment.

In accordance with an embodiment, a virtual assembly builder can be used to virtualize installed components in a reference environment, and then deploy those components into another destination environment. A user can capture the configuration and binaries of software components into software appliance artifacts, which can be grouped and their relationships defined as software assembly artifacts.

In accordance with an embodiment, a generic product introspector plugin allows users to specify at introspection, during creation of a virtual assembly, one or more metadata properties to be exposed for editing and configuration by scripts, during a subsequent rehydration of the virtual assembly. The properties exposed for editing and configuration by scripts can be used during instantiation of an instance of the assembly to define one or more inputs and outputs for the instance.

Virtual Assembly Builder (VAB)

Figure 1:
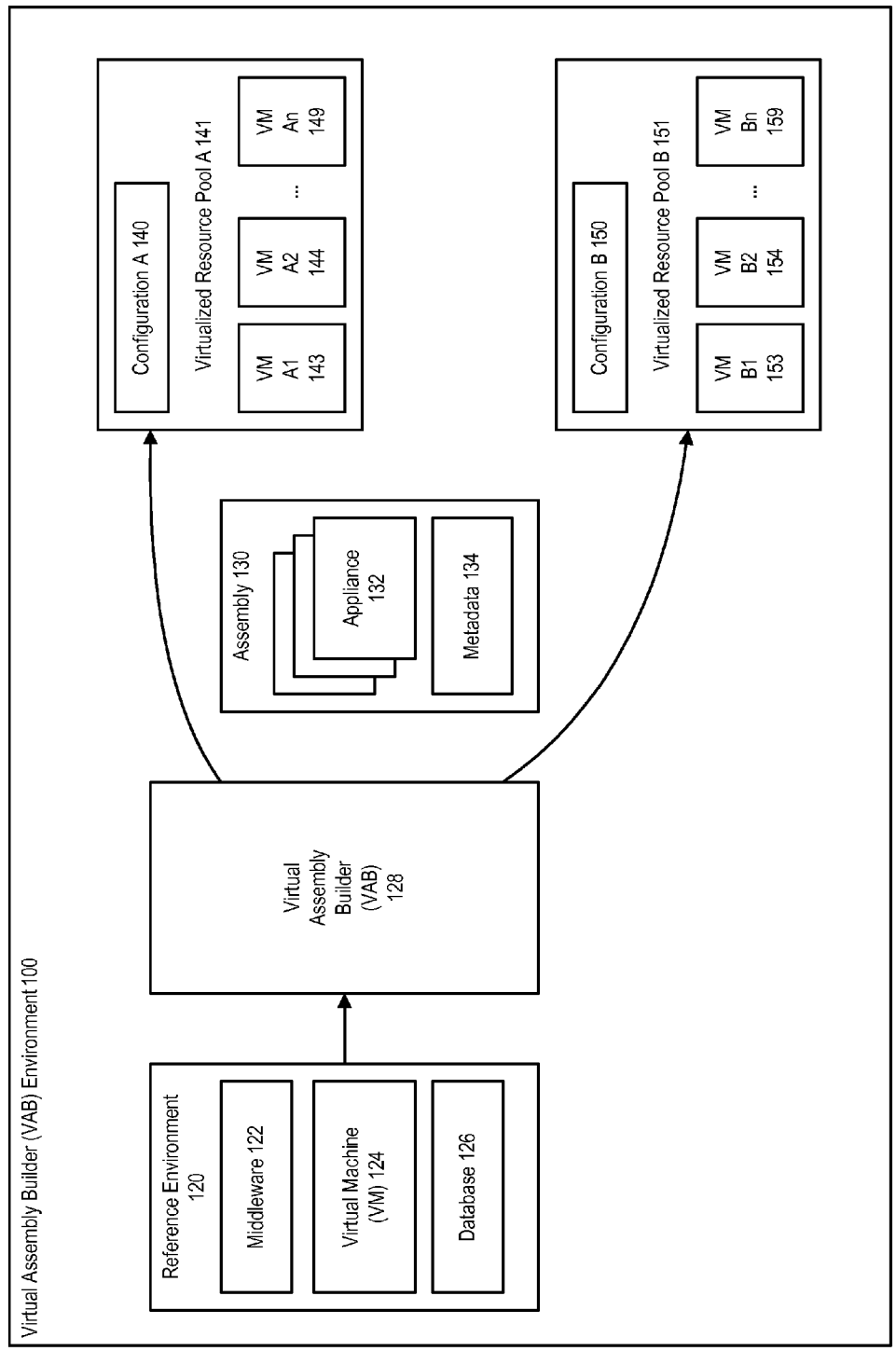
FIG. 1 illustrates a virtual assembly builder environment, in accordance with an embodiment.

FIG. 1 illustrates a virtual assembly builder environment 100, in accordance with an embodiment. As shown in FIG. 1, a virtual assembly builder (VAB) 128 (e.g., Oracle Virtual Assembly Builder, OVAB) can be used to introspect a reference environment 120, which includes one or more installed software components, such as middleware 122, virtual machine 124, and/or database components 126. The virtual assembly builder can then prepare one or more assemblies 130, each of which includes an appliance 132 and associated metadata 134, for deployment into a destination environment having one or more virtualized resource pools 141, 151, of virtual machines or servers 143, 144, 149, 153, 154, 159, according to one or more configurations 140, 150.

In accordance with an embodiment, a virtual appliance (generally referred to herein as an appliance) represents a software component and its local execution environment. For example, an appliance can include an application configuration, binaries, and operating system.

In accordance with an embodiment, a virtual assembly (generally referred to herein as an assembly) is a collection of interrelated appliances that are configured to work together upon deployment to a pool of hardware resources. Assemblies may also provide capabilities that increase their usefulness in a production environment, such as support for externalized configuration in the form of metadata; a means of defining a start order of appliances to reflect interdependencies; and/or support for referencing external systems such as databases, servers, or security providers.

In accordance with an embodiment, the virtual assembly builder can include a visual or command-line configuration environment, or other tool or interface, which enables users to construct assemblies encompassing complex application structures. For example, interfaces can be provided that allow a user to browse and re-use a catalog of existing appliances and assemblies, or to modify connections between appliances using drag-and-drop or editable properties.

In accordance with an embodiment, assembly creation and deployment is a multi-step process. In an introspect phase, a user can capture configuration metadata for individual or multiple distributed software components. Target components may reside locally or remotely, on systems that may be physical or virtual.

In a configure phase, the user can use one or more interfaces to configure assemblies, for example by dragging-and-dropping appliances maintained in a navigable catalog; establishing relationships between appliances; and/or creating connections from appliances to external resources such as databases, servers, or security providers.

In a prepare phase, the user can create bootable virtual machine disk images, which include a customized operating system (OS) distribution and configurable metadata that allows for deploy-time customization of the software component.

In a deploy phase, the user can discover targets that are available in a virtualized environment; create customized deployment configurations; stage appliance disk images; deploy assemblies onto targets; scale appliance instances if required; and automatically wire deployed instances to existing assemblies.

For example, in accordance with an embodiment, a virtual assembly builder can be used as described above, to capture an existing condition of a set of Oracle Fusion Middleware (FMW) and Oracle Database software components from a source environment, represent the components as assemblies, and enable their deployment into a destination environment.

Figure 2:
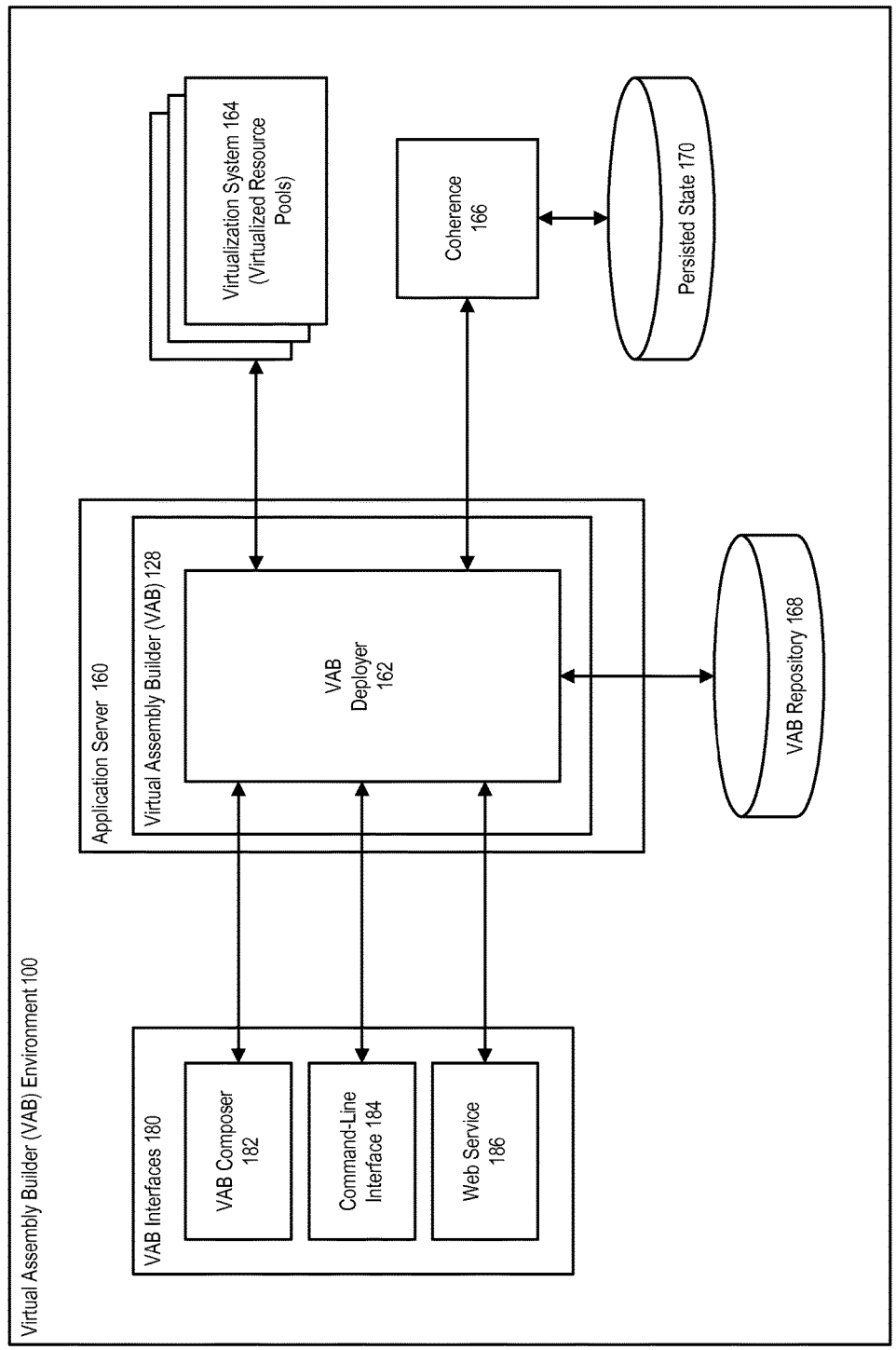
FIG. 2 further illustrates a virtual assembly builder environment, in accordance with an embodiment.

FIG. 2 further illustrates a virtual assembly builder environment, in accordance with an embodiment. As shown in FIG. 2, in accordance with an embodiment, a virtual assembly builder environment can include a VAB deployer 162, hosted at an application server 160, which provides access to one or more virtualization systems having resource pools 164, a VAB repository 168, and a storage component (e.g., Oracle Coherence) 166 that enables persistence of state 170. Access to the VAB deployer and its operations can be provided by one or more VAB interfaces 180, for example a VAB composer component 182, a command-line interface 184, or a Web service 186 or other interface.

In accordance with an embodiment, the VAB interfaces allow a user to perform the introspect, configure, and prepare phases of assembly creation; and also provide support for uploading, registering, and managing assembly archives and instances. For example, the VAB deployer maintains a repository of assembly archives created by the interfaces, and provides operations for registering assemblies to virtualized systems (e.g., Oracle VM, OVM), and orchestrating the deployment of software components defined by the archives.

A minimal appliance generally includes a metadata describing the condition of the original software component, together with a set of component-specific files that allow its configuration to be recreated at deployment time. While an assembly is being prepared for deployment, additional configuration information can be stored with the metadata. In accordance with an embodiment, the metadata includes a description of each of the component's logical inputs and outputs, collectively referred to as endpoints. For example, the HTTP input, and mod_wl_ohs output, of an HTTP server are examples of input and output endpoints respectively. Endpoints can include information such as protocols, ports, and URLs. The virtual assembly builder captures enough information about each endpoint to allow connections to be updated after a component is captured and before it is deployed. This helps ensure that appliances can be connected correctly within the destination environment.

In accordance with an embodiment, the introspection process generates file set definitions that specify one or more file system hierarchies that must be captured to reproduce the component installation in the destination environment. The virtual assembly builder may also capture a copy of the actual installation described by the metadata, referred to herein as a file set. In accordance with an embodiment, the virtual assembly builder creates an XML description of the component, which provides a snapshot of the component's configuration at the time of introspection.

In accordance with an embodiment, introspection can be plugin-based, including the use of a plugin for each supported component type. In most cases, the result of introspecting a component is an appliance; however, in some cases, such as when the virtual assembly builder is used to introspect an application server domain, the associated introspector plugin can generate an assembly, for example with an appliance representing the domain's administration server, and other appliances representing domain managed servers.

In accordance with an embodiment, generic appliances can be constructed using a "GenericProd" appliance type, which allows the user to create and deploy an application product as an appliance, for which the virtual assembly builder might not have built-in support. Such appliances generally do not make use of product-specific logic to capture configuration or product location; instead, a relatively simple appliance is created and a set of user-supplied properties, paths, and scripts that make up the product are added. The set of scripts passed at creation can be subsequently executed at deployment to perform any required operations.

In accordance with an embodiment, assemblies and appliances can be represented in a persistent storage, such as a disk, in an area referred to as the catalog. Assembly and appliance artifacts, and metadata, can be stored in nested directories within subfolders of the catalog's root directory.

In accordance with an embodiment, an assembly template is a set of virtual disk images that can be used to create and start new virtual machine instances. Templates comprising a guest operating system, and appliance file sets and metadata, can be created for each appliance in an assembly, and then made available to virtualized environments by registering them to that environment, at which point virtual machine instances can be created based on the templates.

In accordance with an embodiment, when defining an assembly, it may be necessary to reference servers or resources that lie outside the assembly. For example, an organization's environment may include external resources such as databases, servers, or security providers that are shared by many unrelated virtual deployments. In accordance with an embodiment, external components can be defined in templates to represent resources that exist in an environment but will not be deployed as appliances. Representing these as external resources ensures that the referencing appliances within the assembly are correctly configured at deployment time.

In accordance with an embodiment, a deployment plan can be used to specify a network in a virtualization environment to be used for each logical network declared in an assembly archive. A user can create a deployment plan which customizes default assembly and appliance properties, and provides deployment-specific information such as a network configuration. For example, in accordance with an embodiment, the VAB deployer can create and attach one or more hypervisor virtual networks (Vnets) to the virtual machines it interacts with.

Different virtualization systems organize their resources in different ways, and require different information for referencing and accessing those resources. In accordance with an embodiment, to provide a common user experience across different systems, targets can be used to reference a resource or pool of resources in a virtualized system. The configuration information provided for each target is specific to the virtualization system containing the target. An assembly instance is a deployable instance of an assembly archive for a specific target virtual environment; while an appliance instance is an instance of an appliance running or created in the target virtual environment.

Assembly instances can be associated with a lifecycle. For example, a user can create an assembly instance by selecting an assembly, a deployment plan, and a target to which the assembly must be deployed. Deployment of an assembly instance will then transition through various phases, for example, staged, deployed, and failed, during each of which phases a subset of operations can be made available. For example, when an assembly instance is deployed, the user can start and stop appliance instances, or increase or decrease the number of appliance instances associated with the deployed assembly instance.

Virtual Assembly Builder with Cloud Environments

In accordance with various embodiments, a virtual assembly builder can be used with a cloud computing environment, for example an environment that utilizes hardware and software to enable a cloud-based platform for developing and deploying software applications.

Figure 3:
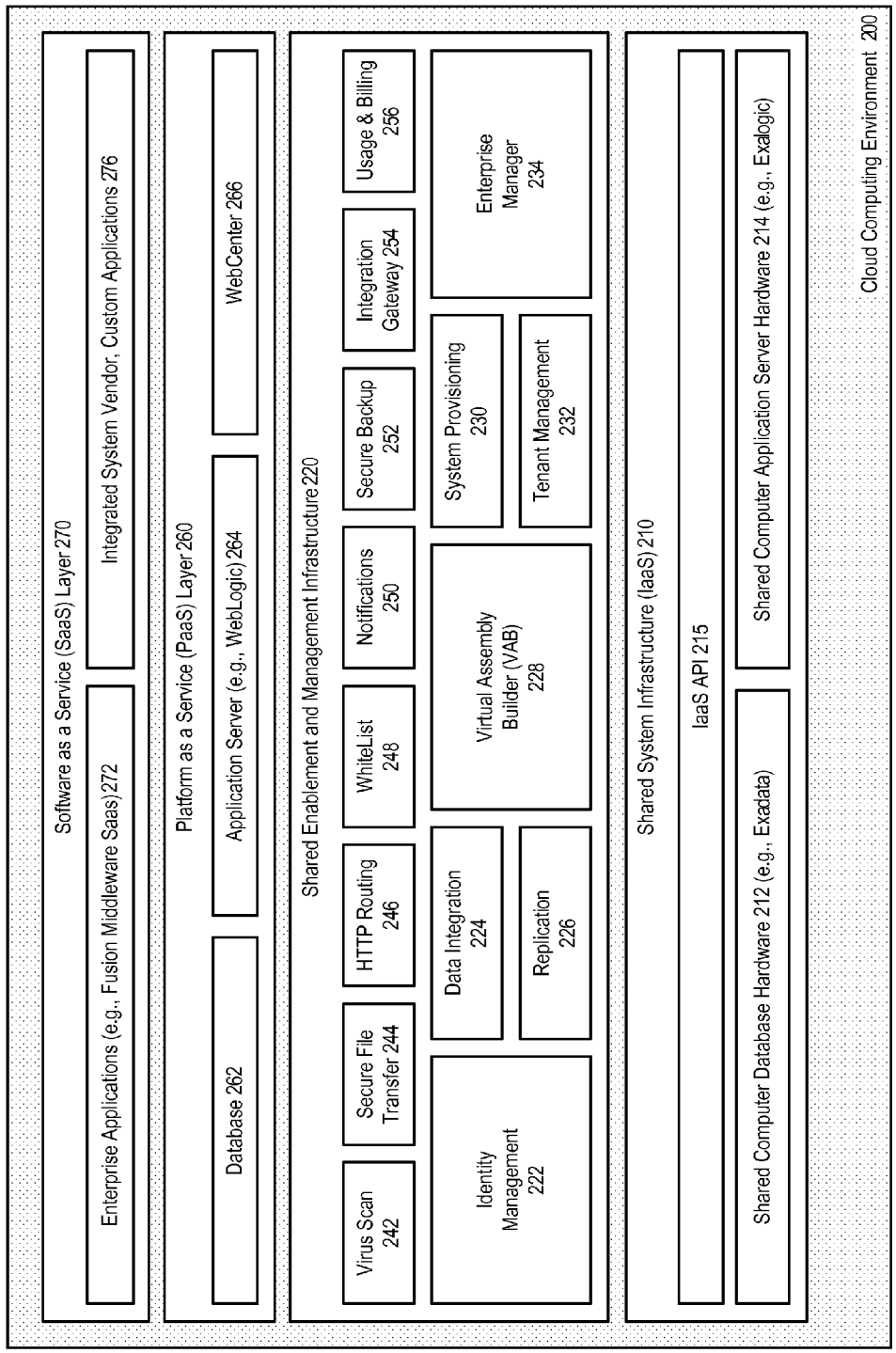
FIG. 3 illustrates an exemplary cloud computing environment, which can utilize a virtual assembly builder, in accordance with an embodiment.

FIG. 3 illustrates an exemplary cloud computing environment, which can utilize a virtual assembly builder, in accordance with an embodiment. As shown in FIG. 3, a cloud computing environment (referred to herein in some embodiments as a cloud environment, or cloud) 200 can include a combination of one or more Infrastructure as a Service (IaaS) layer 210, Platform as a Service (PaaS) layer 260, and/or Software as a Service (SaaS) layer 270, which can be used by consumers that are private or public to an organization depending on the particular cloud computing model being used.

In accordance with an embodiment, the cloud environment can be implemented as a system that includes a computer hardware such as one or more conventional general purpose or specialized digital computers, computing devices, machines, microprocessors, memory and/or computer readable storage media. For example, in accordance with an embodiment, the IaaS layer can include a shared database hardware (e.g., an Exadata machine) 212, and/or a shared application server hardware (e.g., an Exalogic machine) 214, which are accessible via an IaaS API 215. The PaaS layer can include one or more PaaS services, such as a database service 262, application service 264, and/or WebCenter service 266; while the SaaS layer can include various SaaS services, such as enterprise applications (e.g., Oracle FMW SaaS) 272, and/or ISV or custom applications 276. The cloud environment can also include a shared enablement and management infrastructure 220 which provides tools that support the various service layers, for example, one or more identity management 222, data integration 224, replication (e.g., Oracle GoldenGate) 226, virtual assembly builder 228, system provisioning 230, tenant management 232, enterprise manager 234, virus scan 242, secure file transfer 244, HTTP routing 246, whitelist 248, notifications 250, secure backup 252, integration gateway 254, usage and billing 256, or other components.

Figure 4:
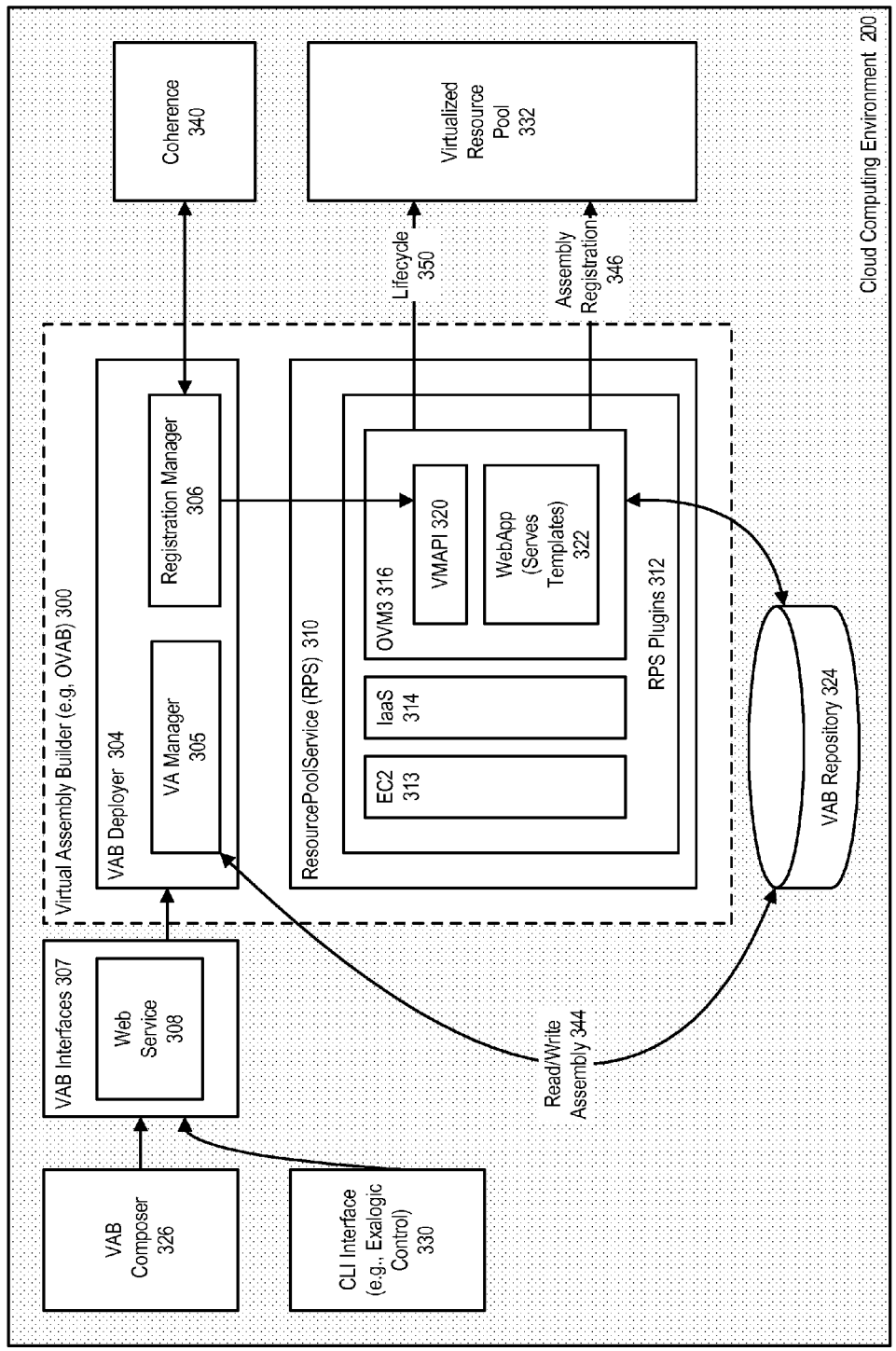
FIG. 4 illustrates the use of a virtual assembly builder in a cloud computing environment, in accordance with an embodiment.

FIG. 4 illustrates the use of a virtual assembly builder in a cloud computing environment, in accordance with an embodiment. As shown in FIG. 4, in accordance with an embodiment, a virtual assembly builder component 300 maintains a repository 324 of assembly archives. In accordance with an embodiment that uses OVAB, the assembly archives can be Oracle Virtual Assembly (OVA) format archives.

As described above, in accordance with an embodiment, assemblies can be created using a VAB composer 326, command-line interface 330, or other configuration product such as OVAB Studio. A VAB deployer component 304 can be accessed, for example, by a Web service 308 or other VAB interface 307, and enables operations for uploading 344 assemblies to the repository, and registering assemblies with cloud components.

In accordance with an embodiment, the VAB deployer can be deployed within an application server or administration server, or within a collection of managed servers. Multi-instance embodiments can utilize a shared database, disk, or storage functionality as provided by, e.g., Coherence 340, for storage of the deployer's runtime and configuration state.

In accordance with an embodiment, the VAB deployer can include a virtual assembly manager 305 for enabling access to the repository, and a registration manager 306 which provides access to a resource pool service (RPS) 310 that supports the use of one or more resource pool service plugins 312, for example, Oracle VM 3 (OVM3) 316, IaaS 314, and/or EC2 313 plugins. In accordance with an embodiment, a plugin can support the use of a VM message API (VMAPI) 320, and templates 322, which enable the registration of assemblies 346 with a resource pool 332 or virtual machine (VM), and their subsequent lifecycle management 350.

Some virtualization systems allow tags to be associated with artifacts such as templates or VM instances, which can then be queried, for example to find artifacts associated with a particular deployment.

As part of the virtual assembly builder's lifecycle, assemblies can be uploaded to the VAB deployer's repository, e.g., using an UploadAssemblyArchive operation. An assembly can then be registered with one or more targets, e.g., using a RegisterAssemblyArchive operation. Registration can include registering the assembly's templates with a resource pool within the virtual assembly builder environment. After an assembly has been registered with a target, one or more deployments can be created for that registration, e.g., using a CreateAssemblyInstance operation. Once a deployment has been created, the initial instances for the assembly can be created and started. While this is being performed, the VAB deployer can use a rehydration logic embedded in the initialization scripts of those instances, to rehydrate the assembly, including configuring various aspects of the assembly, such as its operating system, networks, or disk volumes.

In accordance with an embodiment, the VAB deployer can configure a virtual machine application stack for use within an environment. For example, information can be provided for configuring connections between service instances that are to be created when the application starts up. Once an assembly has been deployed, additional lifecycle operations can be applied to the running system, such as scaling to increase or decrease the number of running instances for a particular appliance within an assembly.

Figure 5:
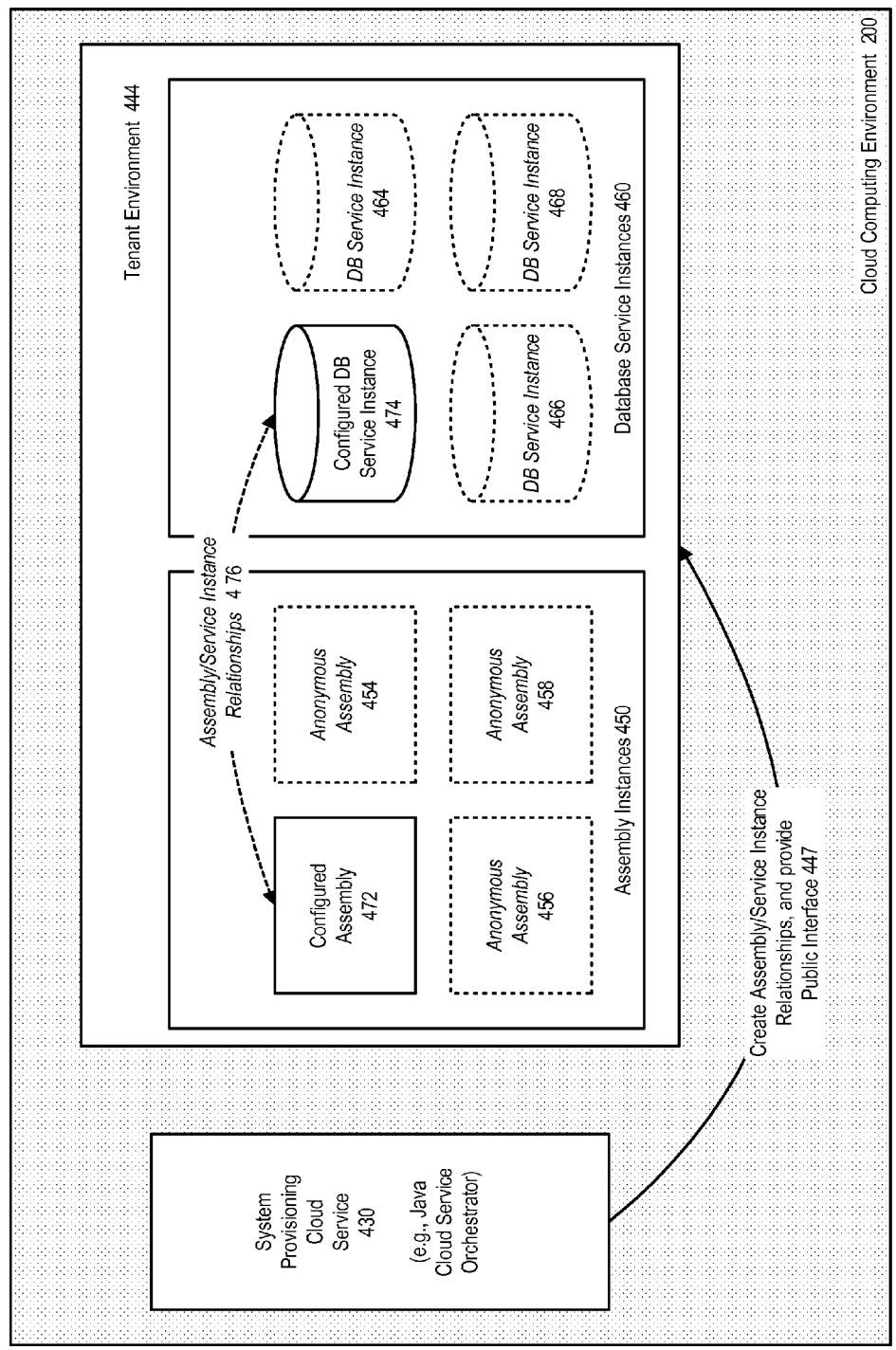
FIG. 5 illustrates an exemplary use of a virtual assembly builder in a cloud computing environment, in accordance with an embodiment.

FIG. 5 illustrates an exemplary use of a virtual assembly builder environment in a cloud computing environment, in accordance with an embodiment. For example, a cloud environment such as Oracle Public Cloud (OPC) can include a Java cloud services infrastructure, which allows a suite of software applications, middleware, and database offerings to be delivered to customers in a self-service manner.

As shown in FIG. 5, in accordance with an embodiment, a system provisioning cloud service 430 can receive an order, from a customer, for a tenant environment to be created 444, including assembly instances 450 and/or service instances 460. The system can initially create 447 a plurality of anonymous assemblies (e.g., 454, 456, 458) and service instances (e.g., 464, 466, 468). Each of the assembly and/or service instances can then be configured to meet the order requirements. For example, a particular assembly 472, and/or a particular service instance 474, can be configured to work together. In the context of a Java cloud service, the resultant platform instance can contain the resources and relationships 476 that are required to provide a WebLogic or other application server service, together with, e.g., an instance database, administration server, and one or more application servers.

Generic Product Wiring

As described above, using a virtual assembly builder, a user can capture the configuration and binaries of software components into software appliance artifacts, which can be grouped and their relationships defined as software assembly artifacts.

In accordance with an embodiment, a generic product introspector plugin allows users to specify at introspection, during creation of a virtual assembly, one or more metadata properties to be exposed for editing and configuration by scripts, during a subsequent rehydration of the virtual assembly.

As previously described, generic appliances can be constructed using a "GenericProd" appliance type, which allows the user to create and deploy an application product as an appliance, for which the virtual assembly builder might not have built-in support. However, previously, such generic appliances could not contain appliance inputs, and could not be used to automatically configure connections established to the appliance.

In accordance with an embodiment, a generic product introspector plugin enables configuring of inputs and outputs on appliances. Metadata associated with the appliance's inputs and outputs can be exposed to user-supplied rehydration scripts, so that the network connections of the underlying captured product can be configured according to the details supplied by the user during assembly editing, and the destination environment into which the appliance is ultimately deployed.

In accordance with an embodiment, a first host can use a generic product introspector plugin to prepare a software product to be deployed to a destination environment, including, during introspection, associating a metadata with the first host's input and output sockets. Additional hosts can then, during deployment of their own components and software products, consume or otherwise receive the metadata associated with the first host's input and output sockets, and configure their own components and software products to properly communicate with the inputs and outputs of the software product at the first host.

Figure 6:
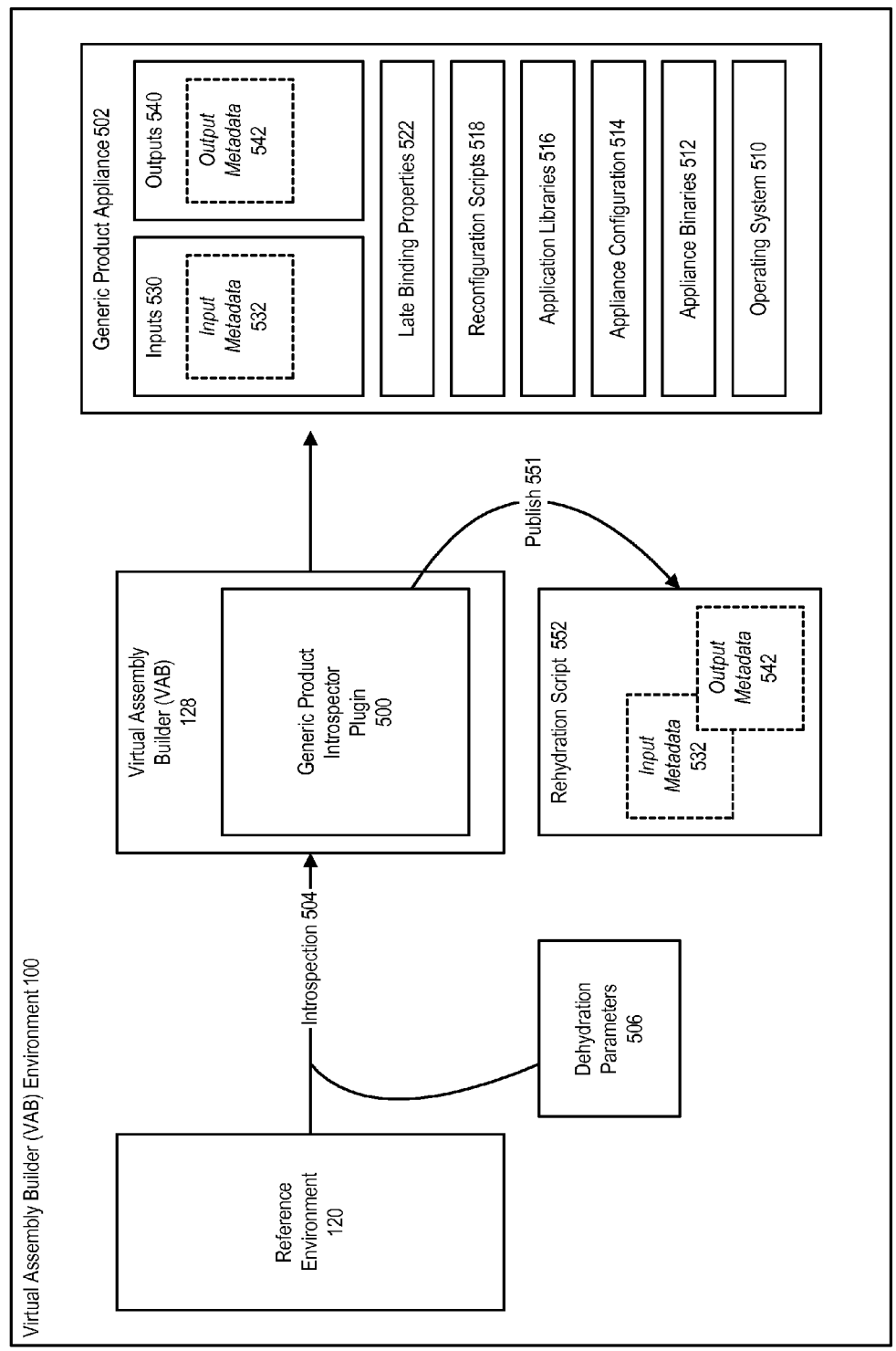
FIG. 6 illustrates use of a generic product introspector plugin that supports generic product wiring, in accordance with an embodiment.

FIG. 6 illustrates use of a generic product introspector plugin with a virtual assembly builder, in accordance with an embodiment.

As shown in FIG. 6, the virtual assembly builder is provided with a generic product introspector plugin 500, which works with the assembly builder to provide introspection 504 of a reference environment. In accordance with an embodiment, the virtual assembly builder can be used to build a generic product appliance 502, including one or more of an operating system 510, appliance binaries 512, appliance configuration 514, application libraries 516, reconfiguration scripts 518, and late binding properties 522, and inputs 530 and outputs 540.

In accordance with an embodiment, the inputs and outputs of the appliance can be associated with an input metadata 532, and output metadata 542, respectively.

During introspection, the generic product introspector plugin can be provided with a rehydration parameter 506, which causes the plugin to publish 551 its metadata information to a rehydration script 552, including the input metadata and output metadata.

The rehydration script can then be optionally configured or edited by a user, including its input metadata and/or output metadata, to configure the network connections of the underlying captured product when deployed to the destination environment.

Appliance Inputs

In accordance with an embodiment, an appliance input represents the configuration of a host and port on which a component opens a socket, waits for connections to be established, and handles incoming requests. Examples of the types of metadata that can be associated with an appliance input include:

The port on which the component will establish the socket.

The host on which the component will establish the socket, which is determined at deployment.

The protocol(s) that the component will handle on the socket.

A set of configurable properties with details describing how the endpoint should be configured and/or connected to.

A set of static properties with details describing how the endpoint should be configured and/or connected to.

The original host and port used by the component at the time of capture.

During rehydration, the generic product introspector plugin, and other introspector plugins, can examine the metadata of their appliance inputs, and use the appliance input information to modify their own configuration of sockets the appliance will open for handling incoming requests.

Other components that will connect to these sockets can also examine the metadata during rehydration, in order to appropriately modify their client-side connection configurations.

In accordance with an embodiment, appliance inputs can be provided as *.input files which comprise properties expressed as key/value pairs, one per line, with the form of <key>=<value>. The keys are not guaranteed to be valid shell variable names, so endpoint files cannot be sourced to create shell variables. Examples of the types of properties that can be contained in *.input files include:

port: required protocols: required, comma separated list with no whitespace host: derived internally, available at rehydration userprop.<property-name>: optional, always type= "STRING"

sysprop.<property-name>: optional, always type= "STRING"

original-port: optional original-host: optional

In accordance with an embodiment, properties denoted as required must be specified in the files supplied at introspection. The host property should not be specified by the user and is instead derived automatically during rehydration. Rehydration scripts can use the value of the host property to set the listening address when configuring an appliance input (ApplianceInput), and to set the connection address when configuring an appliance output (ApplianceOutput).

Appliance Outputs

In accordance with an embodiment, an appliance output represents the configuration of a host and port to which a component establishes connections and sends requests. Examples of the types of metadata that can be associated with an appliance output include:

The protocol that the component will use on the connection.

A set of configurable properties with details describing how the component will establish connections.

A set of static properties with details describing how the component will establish connections.

A set of properties needed on any compatible input to which this output will connect to.

The original host and port used by the component at the time of capture.

In accordance with an embodiment, appliance outputs can be similarly provided as *.output files and similarly comprise properties expressed as key/value pairs, one per line, with the form of <key>=<value>. Again, the keys are not guaranteed to be valid shell variable names, so endpoint files cannot be sourced to create shell variables. Examples of the types of properties that can be contained in *.output files include:

protocol: required connected-input: derived internally, available at rehydration userprop.<property-name>: optional, always type= "STRING"

sysprop.<property-name>: optional, always type= "STRING"

original-port: optional original-host: optional conn-userprop.<property-name>: optional, for specifying requirements on connected inputs conn-sysprop.<property-name>: optional, for specifying requirements on connected inputs In accordance with an embodiment, properties denoted as required must be specified in the files supplied at introspection. The connected-input property should not be specified by the user and is instead derived automatically during rehydration.

Rehydration scripts can use the value of the connected-input property to derive the name of the *.input file (e.g., by appending ".input" to the name). The filename indicated by the connected-input property can be indicated in the form of <assembly-path>:<input-name>, where each component of <assembly-path> is separated by a '.' (period), with the filename prefixed with the assembly-path to avoid input name collision.

For example, for an appliance at path "mySite/otherAppliance", which has an input "otherInput", and which is connected to an output named "output1" on a target generic product appliance, then the connected output file, "output1.output" would contain the property connected-input=mySite.otherAppliance:otherInput; while the *input file representing "otherInput" would be located at the path $AB_ENDPOINT_DIR/mySite.otherAppliance:otherInput.input, alongside all other *.input and *.output files.

During assembly editing, connections between appliance outputs and appliance inputs can be configured so that the owner of an appliance output can discover the metadata of an appliance input to which it should connect.

Figure 7:
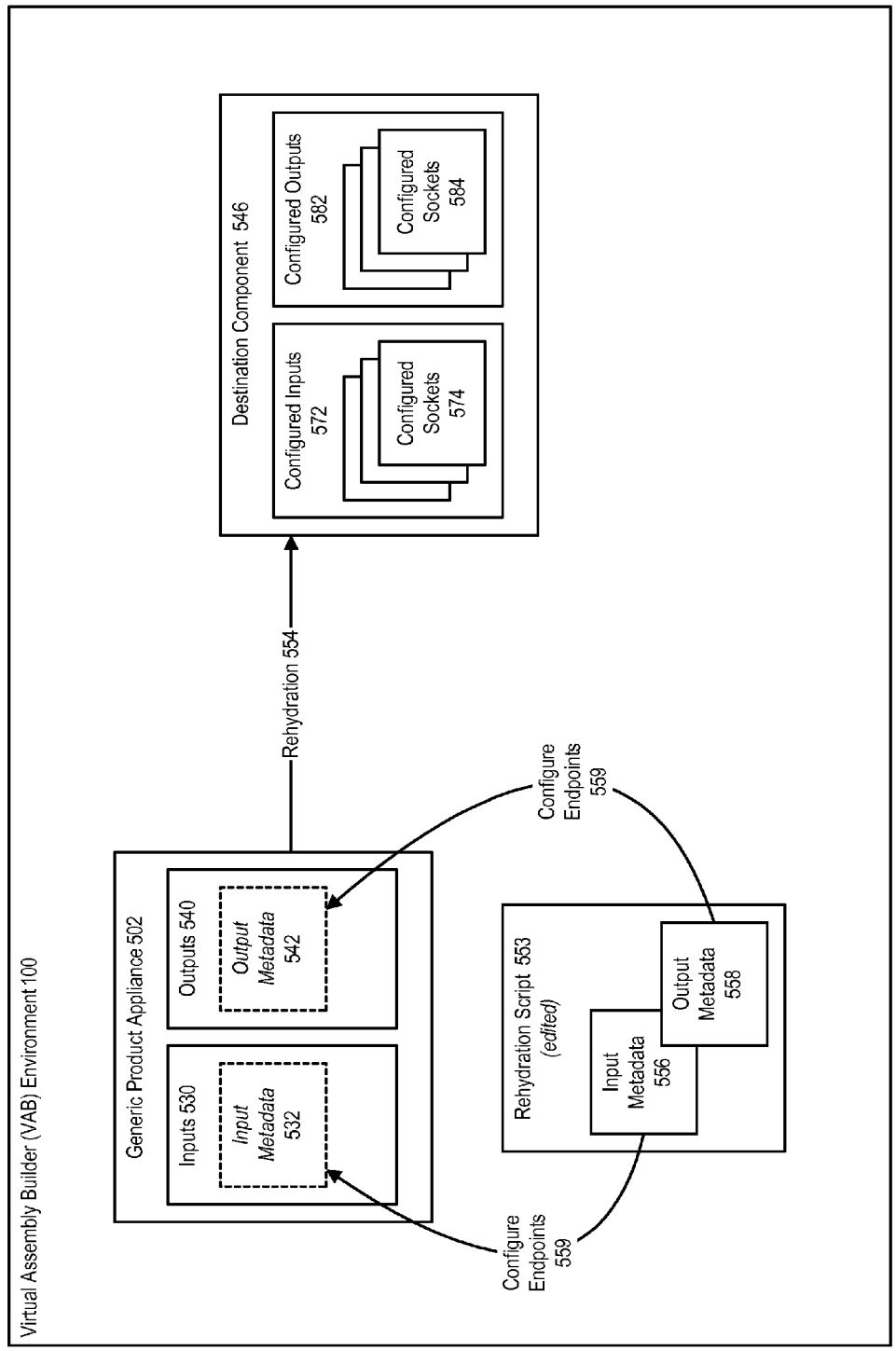
FIG. 7 further illustrates use of a generic product introspector plugin with a virtual assembly builder, in accordance with an embodiment.

FIG. 7 further illustrates use of a generic product introspector plugin with a virtual assembly builder, in accordance with an embodiment.

As shown in FIG. 7, during rehydration 554 to create a destination component 546, the rehydration script can be optionally configured or edited 553 by a user, including its input metadata 556 and/or output metadata 558.

In accordance with an embodiment, introspector plugins can examine the metadata of their own appliance outputs and the appliance inputs to which those outputs are connected. The rehydration script including its metadata can be used to configure endpoints 559, and to ultimately modify, for a destination component, the configurations of its sockets that the component will open for sending and receiving requests, so that other components and products associated therewith can be automatically wired to the product that is deployed to the destination environment.

For example, in accordance with an embodiment, a first host A can use a generic product introspector plugin to prepare a software product to be deployed to a destination environment, including, during introspection, associating a metadata with host A's input and output sockets. Additional hosts B and C can then, during deployment of their own components and software products, consume or otherwise receive the metadata associated with host A's input and output sockets, and configure their own components and software products to properly communicate with the inputs and outputs of the software product at host A.

For example as shown in FIG. 7, upon rehydration the appliance can define a destination component with input endpoints 572 and output endpoints 582, whose sockets 574, 584 respectively are configured according to the provided input metadata and output metadata, and the rehydration script. Additional hosts can use the input metadata associated with the sockets, to discover how to properly connect to those sockets. For example, an additional host can use the input metadata associated with a listening socket at a first host, to discover how to properly connect to that listening socket.

Figure 8:
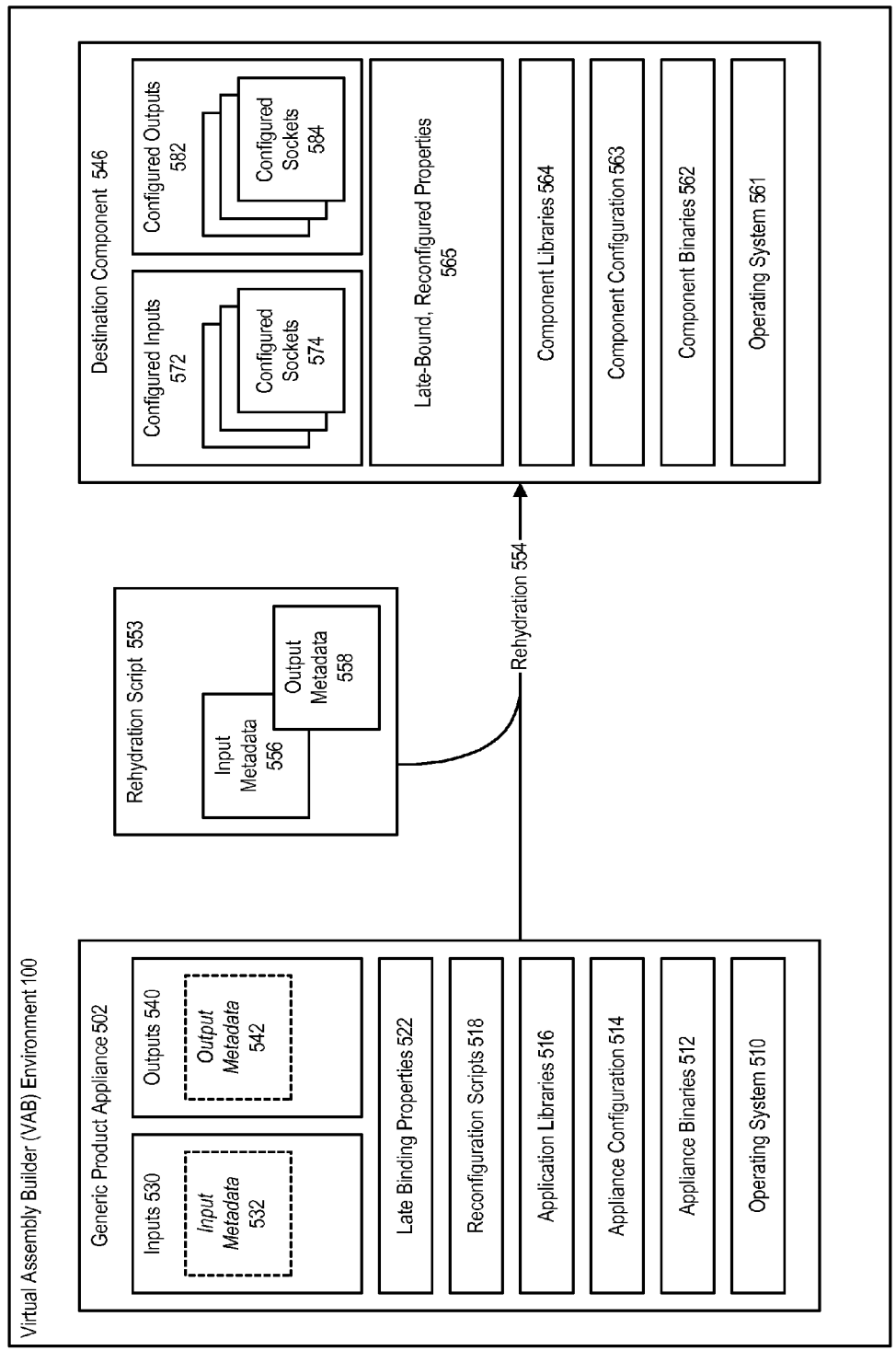
FIG. 8 further illustrates use of a generic product introspector plugin with a virtual assembly builder, in accordance with an embodiment.

FIG. 8 further illustrates use of a generic product introspector plugin with a virtual assembly builder, in accordance with an embodiment.

As shown in FIG. 8, during rehydration 554, the generic product appliance can be used to create a destination component including an operating system 561, component binaries 562, component configuration 563, component libraries 564, late-bound or reconfigured properties 565, together with the appliance inputs and outputs whose sockets are configured in accordance with the rehydration script, as described above.

Creation of Appliance Inputs/Outputs

In accordance with various embodiments, different approaches can be used in creating appliance input and output endpoints. For example, endpoints can be created during introspection, or can be created as an extra step following introspection. In accordance with an embodiment, endpoints are created during introspection and are supplied to the generic product introspector plugin by way of a dehydration parameter including a pointer, e.g., to a file containing the data, which defines multiple inputs and multiple outputs on the resulting generic product appliance.

Exposing Appliance Inputs/Outputs to Scripts

In accordance with an embodiment, the generic product introspector plugin publishes to rehydration scripts the appliance user properties originally supplied at introspection. In accordance with an embodiment, this can be accomplished by writing the properties to a file, and then setting an environment variable $AB_USERPROPS_FILE to the path of the file, when subsequently executing scripts.

A similar approach can be used for publishing to scripts the metadata associated with the inputs and outputs of the appliance, in addition to the inputs of other appliances to which the generic product appliance will be connected.

Generic Product Introspector Plugin Parameters

In accordance with an embodiment, the generic product introspector plugin recognizes an ENDPOINTDIR parameter, which points to a directory containing one or more files describing the appliance inputs (ApplianceInput) and appliance outputs (ApplianceOutput) to be added to the appliance as part of introspection, and is passed to all rehydration scripts as an $AB_ENDPOINT_DIR environment variable.

In accordance with an embodiment, there is one file per endpoint, including for ApplianceInput an <input-name>.input file; and for ApplianceOutput an <output-name>.output file. During rehydration of generic product appliances, one or more endpoint files are created for all appliance inputs and appliance outputs of the appliance. Endpoint files are also created for appliance inputs of other appliances to which the generic product appliance will be connected.

In accordance with an alternative embodiment, the endpoint metadata can be stored in a single file, for example by using a naming strategy that includes the endpoint name in the key.

In accordance with an alternative embodiment, instead of requiring the user to create files describing endpoints prior to introspection, an interface can be provided for adding endpoints during subsequent assembly editing.

Dehydration and Rehydration Interfaces

In accordance with an embodiment, graphical (GUI) and command-line (CLI) dehydration interfaces can be configured to support the generic product introspector plugin's recognition of appliance inputs and outputs by recognizing the ENDPOINTDIR parameter, and acting accordingly. For rehydration interfaces, the rehydration scripts can be passed the $AB_ENDPOINT_DIR environment variable for locating the recreated *.input/*.output endpoint files.

Figure 9:
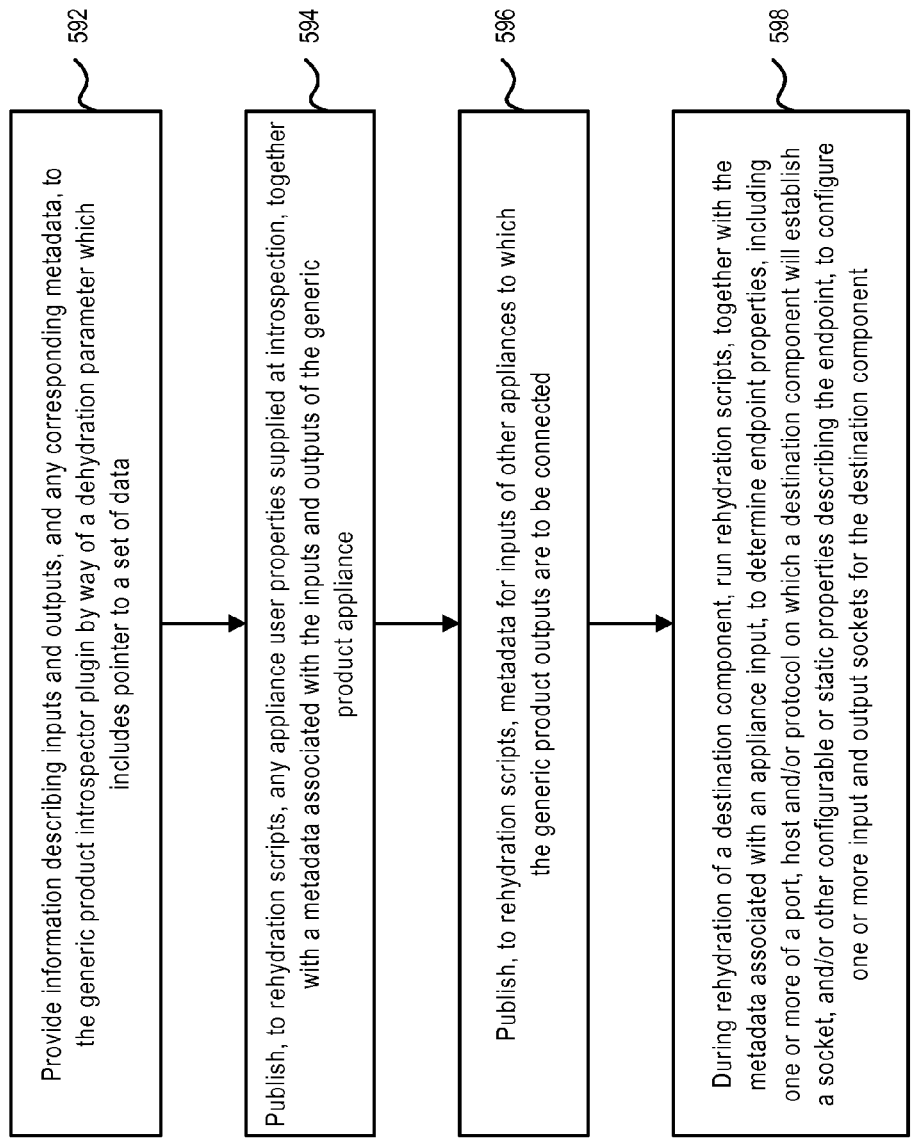
FIG. 9 is a flowchart of a process for generic product wiring in a virtual assembly builder environment, in accordance with an embodiment.

FIG. 9 is a flowchart of a process for using a generic product introspector plugin with a virtual assembly builder, in accordance with an embodiment.

As shown in FIG. 9, at step 592, information describing inputs and outputs, and any corresponding metadata, is provided to the generic product (e.g., GenericProd) introspector plugin by way of a dehydration parameter which includes a pointer to a set of data (e.g., the path to a file containing the data).

At step 594, the generic product introspector plugin publishes, to rehydration scripts, any appliance user properties supplied at introspection, together with a metadata associated with the inputs and outputs of the generic product appliance.

At step 596, the generic product introspector plugin publishes, to rehydration scripts, metadata for inputs of other appliances to which the generic product outputs are to be connected.

At step 598, during rehydration of a destination component, the system runs the rehydration scripts, together with the metadata associated with an appliance input, to determine a port and host on which the destination component will establish a socket, a protocol that the component will handle on the socket, and a set of configurable or static properties describing how the endpoint should be configured and/or connected; and metadata associated with the appliance output.

In accordance with an embodiment, the rehydration script can be optionally configured or edited by a user, including its input metadata and/or output metadata, to configure the network connections of the underlying captured product when deployed to the destination environment. The system can then use this information to determine a protocol that the component will use on the connection, and a set of configurable or static properties describing how the component will establish connections, so that other components and products associated therewith can be automatically wired to the product that is deployed to the destination environment.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for generic product wiring with a virtual assembly builder in a cloud environment, comprising:
   one or more computers having one or more processors, including a cloud environment executing thereon;
   a virtual assembly builder component, which maintains a repository of assembly archives,
      wherein each assembly archive can be associated with one or more virtual machine templates that can be used to instantiate an instance of an associated assembly, and wherein
      each assembly archive defines an assembly as a collection of one or more software appliances that are configured to work together upon deployment, and
      each software appliance is associated with metadata properties that describe input and output endpoints associated with the software appliance;
   a product introspector plugin associated with the virtual assembly builder component that
      receives, at introspection of a reference host environment, a specification of one or more metadata properties associated with input and output endpoints of a particular software appliance as used within the reference host environment during creation of the particular software appliance, and
      exposes the metadata properties associated with the input and output endpoints of the particular software appliance, for editing and configuration of the metadata properties by one or more scripts, during a rehydration operation of the particular software appliance for use with one or more other host environments; and
   a rehydration script, executed by the one or more processors, that executes the rehydration operation, which deploys the particular software appliance by creating a destination component, wherein the destination component is created by configuring one or more input and output sockets using exposed metadata properties associated with input and output endpoints of the particular software appliance.

2. The system of claim 1,
   wherein the product introspector plugin, during introspection of the host environment, associates a metadata with the host environment's input and output sockets, and
   wherein the one or more other host environments, during deployment of components to those host environments, receives the metadata associated with the host's input and output sockets, and configures its components to communicate with the inputs and outputs at the host environment.

3. The system of claim 1, wherein the one or more scripts are used, during instantiation of an instance of an assembly, to define one or more inputs and outputs for the particular software appliance within the instance of the assembly.

4. The system of claim 3, wherein during introspection, the product introspector plugin publishes metadata property information to the one or more scripts, including the description of the input and output endpoints associated with the software component, for subsequent editing and configuration to define the one or more inputs and outputs for the instance.

5. The system of claim 3, wherein the one or more inputs and outputs for the instance include one or more sockets, and wherein the one or more scripts are used during instantiation of the instance of the assembly to determine a host, port, and other information for the one or more sockets.

6. The system of claim 5, wherein the one or more scripts can be edited prior to rehydration, without modifying the assembly, to modify the host, port, and other information for the one or more sockets.

7. The system of claim 5, wherein during creation of the destination component that includes the instance being instantiated, the system runs the one or more scripts to determine the host, port, and other information, for the one or more sockets at the destination component.

8. A method for generic product wiring with a virtual assembly builder in a cloud environment, comprising:
   providing, at one or more computers having one or more processors, including a cloud environment executing thereon,
      a virtual assembly builder component, which maintains a repository of assembly archives, wherein each assembly archive can be associated with one or more virtual machine templates that can be used to instantiate an instance of an associated assembly, and wherein
      each assembly archive defines an assembly as a collection of one or more software appliances that are configured to work together upon deployment, and
      each software appliance is associated with metadata properties that describe input and output endpoints associated with the software appliance;
   a product introspector plugin associated with the virtual assembly builder component that
      receives, at introspection of a reference host environment, a specification of one or more metadata properties associated with input and output endpoints of a particular software appliance as used within the reference host environment during creation of the particular software appliance, and
      exposes the metadata properties associated with the input and output endpoints of the particular software appliance, for editing and configuration of the metadata properties by one or more scripts, during a rehydration operation of the particular software appliance for use with one or more other host environments; and a rehydration script, executed by the one or more processors, that executes the rehydration operation, which deploys the particular software appliance by creating a destination component, wherein the destination component is created by configuring one or more input and output sockets using exposed metadata properties associated with input and output endpoints of the particular software appliance.

9. The method of claim 8, wherein the product introspector plugin, during introspection of the host environment, associates a metadata with the host environment's input and output sockets, and wherein the one or more other host environments, during deployment of components to those host environments, receives the metadata associated with the host's input and output sockets, and configures its components to communicate with the inputs and outputs at the host environment.

10. The method of claim 8, wherein the one or more scripts are used, during instantiation of an instance of an assembly, to define one or more inputs and outputs for the particular software appliance within the instance of the assembly.

11. The method of claim 10, wherein during introspection, the product introspector plugin publishes metadata property information to the one or more scripts, including the description of the input and output endpoints associated with the software component, for subsequent editing and configuration to define the one or more inputs and outputs for the instance.

12. The method of claim 10, wherein the one or more inputs and outputs for the instance include one or more sockets, and wherein the one or more scripts are used during instantiation of the instance of the assembly to determine a host, port, and other information for the one or more sockets.

13. The method of claim 12, wherein the one or more scripts can be edited prior to rehydration, without modifying the assembly, to modify the host, port, and other information for the one or more sockets.

14. The method of claim 12, wherein during creation of the destination component that includes the instance being instantiated, the system runs the one or more scripts to determine the host, port, and other information, for the one or more sockets at the destination component.

15. A non-transitory computer readable storage medium, including instructions stored thereon which when read and executed by one or more computers cause the one or more computers to perform the steps comprising:

providing, at one or more computers having one or more processors, including a cloud environment executing thereon, a virtual assembly builder component, which maintains a repository of assembly archives, wherein each assembly archive can be associated with one or more virtual machine templates that can be used to instantiate an instance of an associated assembly, and wherein each assembly archive defines an assembly as a collection of one or more software appliances that are configured to work together upon deployment, and each software appliance is associated with metadata properties that describe input and output endpoints associated with the software appliance;

a product introspector plugin associated with the virtual assembly builder component that receives, at introspection of a reference host environment, a specification of one or more metadata properties associated with input and output endpoints of a particular software appliance as used within the reference host environment during creation of the particular software appliance, and exposes the metadata properties associated with the input and output endpoints of the particular software appliance, for editing and configuration of the metadata properties by one or more scripts, during a rehydration operation of the particular software appliance for use with one or more other host environments; and a rehydration script, executed by the one or more processors, that executes the rehydration operation, which deploys the particular software appliance by creating a destination component, wherein the destination component is created by configuring one or more input and output sockets using exposed metadata properties associated with input and output endpoints of the particular software appliance.

16. The non-transitory computer readable storage medium of claim 15, wherein the product introspector plugin, during introspection of the host environment, associates a metadata with the host environment's input and output sockets, and wherein the one or more other host environments, during deployment of components to those host environments, receives the metadata associated with the host's input and output sockets, and configures its components to communicate with the inputs and outputs at the host environment.

17. The non-transitory computer readable storage medium of claim 15, wherein the one or more scripts are used, during instantiation of an instance of an assembly, to define one or more inputs and outputs for the particular software appliance within the instance of the assembly.

18. The non-transitory computer readable storage medium of claim 17, wherein the one or more inputs and outputs for the instance include one or more sockets, and wherein the one or more scripts are used during instantiation of the instance of the assembly to determine a host, port, and other information for the one or more sockets.

19. The non-transitory computer readable storage medium of claim 18, wherein the one or more scripts can be edited prior to rehydration, without modifying the assembly, to modify the host, port, and other information for the one or more sockets.

20. The non-transitory computer readable storage medium of claim 19, wherein during creation of the destination component that includes the instance being instantiated, the system runs the one or more scripts to determine the host, port, and other information, for the one or more sockets at the destination component.

\* \* \* \* \*